H. WEDER, Sr. & C. H. WOLFF.
DIAGNOSTIC INSTRUMENT.
APPLICATION FILED OCT. 13, 1913.
1,229,358.
Patented June 12, 1917.
2 SHEETS—SHEET 2.
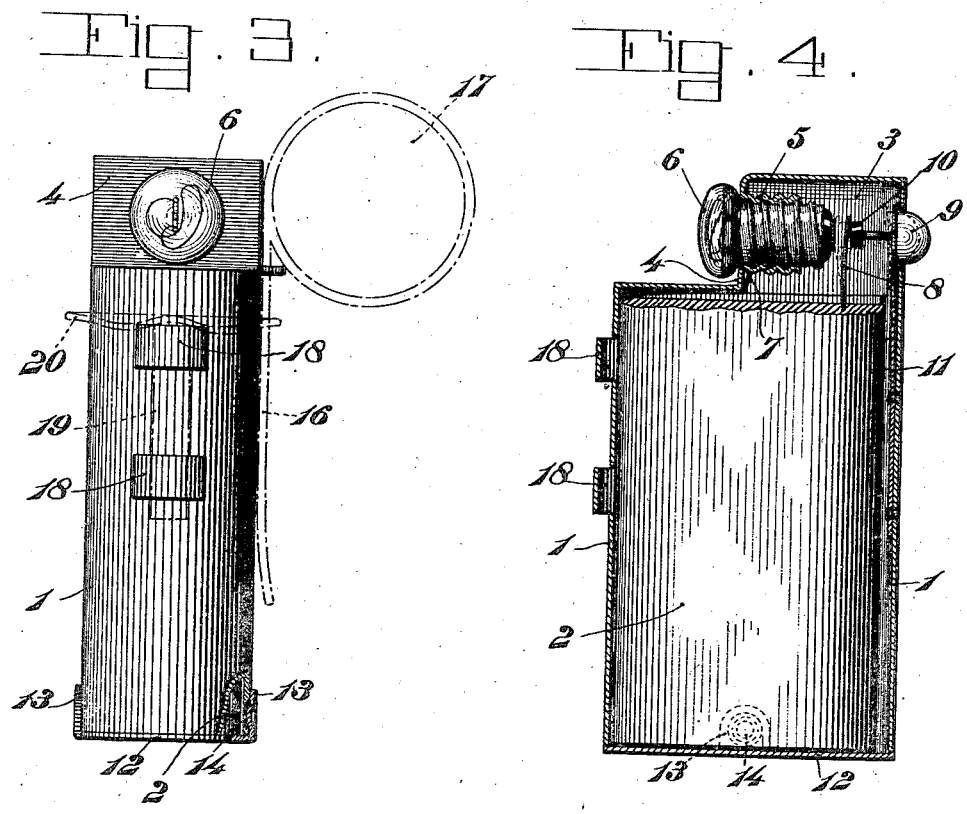
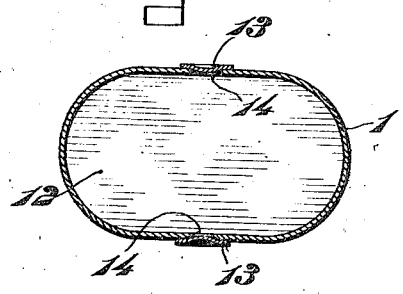

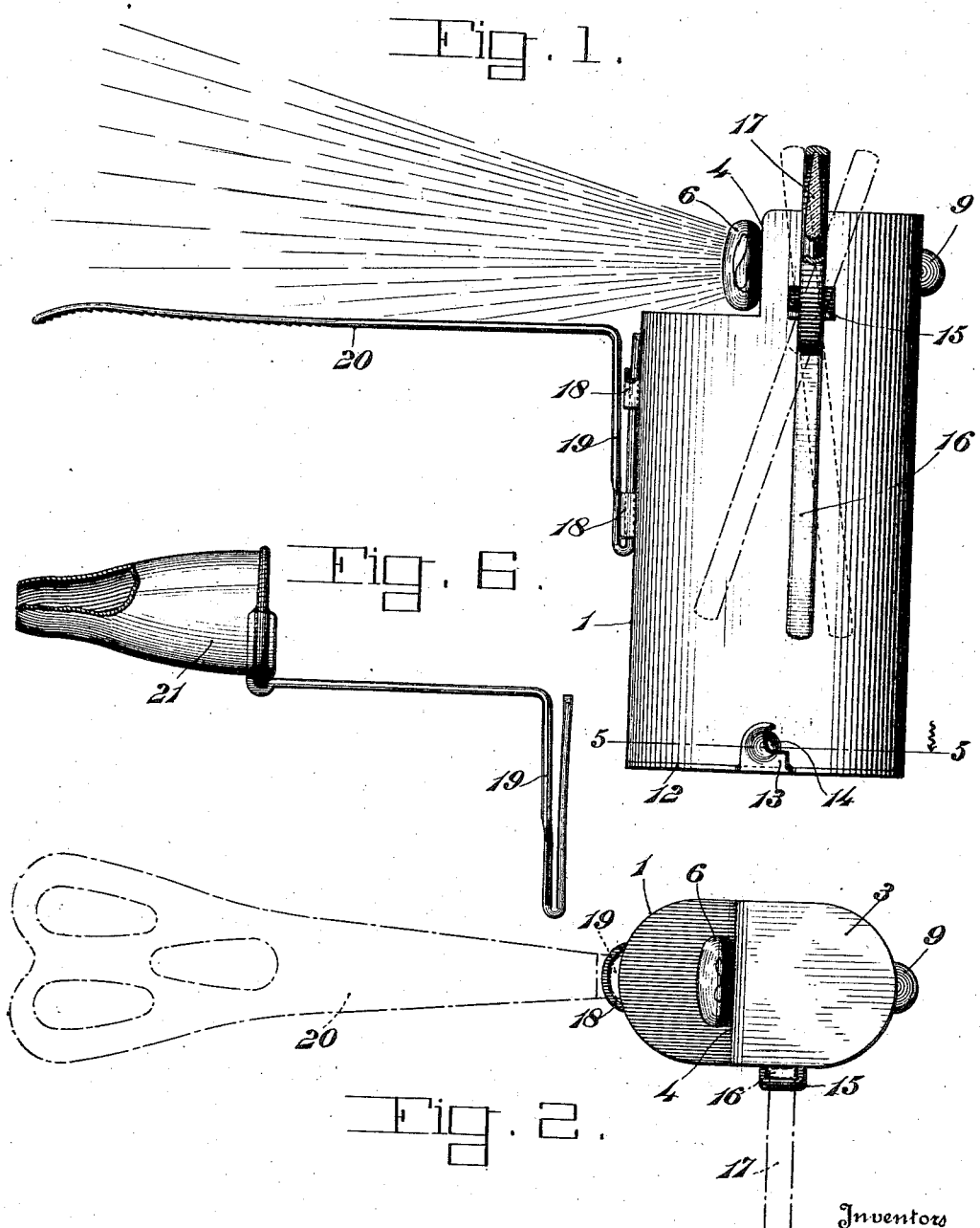

UNITED STATES PATENT OFFICE.

HERMANN WEDER, SR., AND CHARLES H. WOLFF, OF PHILADELPHIA, PENNSYLVANIA.

DIAGNOSTIC INSTRUMENT.

1,229,358. Specification of Letters Patent. Patented June 12, 1917.

Application filed October 13, 1913. Serial No. 794,874.

*To all whom it may concern:*

Be it known that we, HERMANN WEDER, Sr., and CHARLES H. WOLFF, citizens of the United States, residing in Philadelphia, in the county of Philadelphia and State of Pennsylvania, have invented certain new and useful Improvements in Diagnostic Instruments; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to surgical instruments comprising a portable electric lamp and it has for its object to produce an instrument especially well adapted for diagnostic purposes and in which the lamp proper will bear such relation to the lamp casing that the light-rays will be projected away from the user so that there will be no reflection of the rays toward the user; also in features of construction which enable a magnifying glass being sustained by the casing in such relation to the lamp proper that there will be no reflection of light-rays on the glass, and which also will enable certain other diagnostic instruments to be supported by the casing in such relation to the lamp that the light-rays will be projected in relation to the instrument in use so that the best results are attained.

To the accomplishment of the foregoing and such other objects as may hereinafter appear the invention consists in features of construction hereinafter particularly described and then sought to be clearly defined by the claims, reference being had to the accompanying drawings forming a part hereof and in which—

Figure 1 is a side elevation of a lamp constructed in accordance with our invention and showing a tongue-depressor supported at the front of the lamp, and a magnifying glass at the side;

Fig. 2 is a plan view of the same parts;

Fig. 3 is a front elevation of the same parts, the tongue depressor and the magnifying glass being shown in dotted lines;

Fig. 4 is a vertical section through the lamp;

Fig. 5 is a cross section through the lamp on the line 5—5 of Fig. 1 looking in the direction of the arrows;

Fig. 6 is a side view of an ear speculum which may be attached to the lamp.

In the drawings the numeral 1 designates the lamp casing or shell which contains the dry battery cell 2. At one end the shell is formed with a raised chamber 3 in communication with the interior of the shell and occupying a portion only of the end of the shell and formed with a front wall 4 set back from the front wall of the shell and provided with an inwardly extending screw threaded socket 5 designed to receive and support the electric-light bulb 6 so that the light diffusing end of the bulb will lie adjacent to the vertical wall 4 back from the front wall of the shell and in central relation to the wall so as to lie back from the ends of the wall. The wall serves as a shield to the bulb and prevents the lamp rays from being deflected or diffused to the rear or to the sides of the lamp and causes them to be projected to the front of the lamp away from the operator holding the lamp in his hand so that he is protected from any reflection from the lamp and the rays are projected directly upon the object being diagnosed.

The battery cell 2 is provided at one end with a spring-plate 7 which contacts with the lamp socket, and has also a spring-plate 8 which projects into the chamber 3 in line with the terminal of the lamp and with a push button 9 so that when the push button is actuated to press the plate 8 against the terminal of the lamp the electric circuit is made and the light is diffused from the bulb. The push button carries at its point a hard-rubber button 10 so that waste of current is prevented when the lamp is not glowing. The push button is carried by a spring-plate 11 secured to the side of the lamp shell.

The shell has a removable cap 12 at one end which is provided with spring ends or clasps 13 formed with spherical or convex inner faces to engage depressions or openings 14 formed in the sides of the shell so as to hold the cap in place by a sort of snap ball and socket fastening.

The casing or shell is provided at one side, back from the vertical wall 4 of the chamber 3, with an apertured clip 15 designed to receive the shank 16 of a magnifying glass or lens 17 so that the glass is supported at one side of the lamp back from the light emitting portion of the light bulb in order that there may be no reflection of the light-rays on the glass, and thus the glass can be used without annoyances from the rays emitted by the light bulb.

The front wall of the shell is provided with two clips 18, one above the other, designed to receive the forked prong 19 of a tongue depressor 20, or ear speculum 21, or other diagnostic instrument that may be used in connection with the lamp. The farther the prong is pressed up in the clips the tighter the instrument is held to the lamp, and when the lamp is grasped in the hand of the operator the fingers of the hand may grip the prong of the instrument and thus a steadier manipulation of the lamp and instrument may be obtained.

We have illustrated and described the preferred details of construction of the various parts but variations may be made in some of the details and the essential features of the invention be retained.

Having described our invention and set forth its merits, what we claim is—

1. In a diagnostic instrument including an electric-lamp, an incasing shell formed with a battery-cell chamber and at one end with a smaller chamber above and communicating with the battery-cell chamber, the smaller chamber having an upright wall formed with a lamp-bulb receiving socket, a push-button operable through an opening in one wall of the smaller chamber and provided at its inner end with an insulating tip spaced from the terminal of a lamp-bulb fitting in the socket provided therefor in the same chamber, and a battery-cell occupying the larger chamber and having a contact-plate to project into the smaller chamber and lie between the insulated tip of the push-button and terminal of the lamp-bulb, the insulated tip and cell contact-plate being unattached to each other, substantially as described.

2. In a diagnostic instrument including an electric-lamp, a shell formed with a battery-cell chamber, a lamp-bulb receiving socket formed in one wall of the shell, a push-button operably mounted in an opening in the wall of the shell, an insulating tip carried by the inner end of the push-button, and a battery-cell occupying the chamber of the shell and having a contact-plate to project between the terminal of a lamp-bulb fitting in the socket provided therefor and the insulated tip of the push-button, said contact-plate and insulated tip being unattached to each other and adapted to engage one with the other and permitting withdrawal of the cell and its contact-plate away from the insulated tip.

3. In a diagnostic instrument including an electric lamp, a battery-cell incasing shell formed at one end with a lamp-bulb receiving chamber having an upright front wall set back from the front wall of the shell and provided with a lamp-bulb receiving socket, a battery-cell in the incasing shell and circuit closure contacts, and a tiltable lens supported from the side of the shell to one side and back of the front wall of the lamp-bulb receiving chamber, substantially as described.

4. In a diagnostic instrument including an electric lamp, a battery-cell incasing shell elliptical in cross section and formed at one end with a lamp-bulb receiving chamber above the rear portion of the shell, said chamber having an upright front wall set back from the front wall of the shell, a clip applied to the front wall of the shell to support a diagnostic implement, a lamp-bulb extended through the front wall of the lamp-bulb receiving chamber, a battery cell in the incasing shell provided with a contact-plate in alinement with the terminal of the lamp-bulb, and a push-button carrying an insulating button in line with the contact-plate, substantially as described.

In testimony whereof we affix our signatures in presence of two witnesses.

HERMANN WEDER, Sr.
CHAS. H. WOLFF.

Witnesses:
  CHAS. COBB VAN RIPER,
  GLENDORA KESSLER.